UNITED STATES PATENT OFFICE.

CLEMENS A. DIDDEN, OF WASHINGTON, DISTRICT OF COLUMBIA.

IMPROVEMENT IN COMPOSITIONS FOR BLACK MORTAR.

Specification forming part of Letters Patent No. 199,420, dated January 22, 1878; application filed December 11, 1877.

*To all whom it may concern:*

Be it known that I, CLEMENS A. DIDDEN, of the city of Washington, county of Washington, and District of Columbia, have invented a new and useful compound out of which to form black mortar, which compound is fully described in the following specification.

My invention relates to that class of compounds adapted for making black mortar used in laying brick and stone; and consists of certain ingredients, as hereinafter described.

To prepare the ingredients, I take a given quantity of either black sand, or, preferably, coal-dust, and mix with it graphite in a pulverized state. This mixture is then added to slaked lime, water, and other elements entering into the composition of mortar, thus forming a black mortar or cement. Black sand being expensive and not easily obtainable, I find that coal-dust is just as serviceable.

Experience has proven that lamp-blacks and the various pigments which are ordinarily used in the composition of black mortar fade or wash away, and the brick and stone between which the black mortar, as usually made, is laid becomes discolored and stained, as such ordinary black mortar fades when exposed in the wall, and the component pigments wash away under the influence of the weather; but graphite is a mineral of a natural fixed black color, which does not change under atmospheric influence, or any treatment to which it would be subjected by admixture with the other materials out of which mortar is composed, or by exposure when afterward laid in the joints of laid brick or stone.

Having now described my invention, what I claim is—

1. A composition consisting of coal-dust and pulverized graphite, substantially as described, and for the purposes specified.

2. In a mortar or cement for laying brick or stone composed of lime, slaked lime, sand, coal-dust, Portland cement, or any of the elements or combinations of elements composing mortar, graphite as an ingredient or component part, substantially as described, and for the purpose specified.

C. A. DIDDEN.

Witnesses:
GEO. F. GRAHAM,
CHARLES S. WALTER.